US009160743B2

(12) United States Patent
Anantharaman

(10) Patent No.: US 9,160,743 B2
(45) Date of Patent: Oct. 13, 2015

(54) BIOMETRICS BASED ELECTRONIC DEVICE AUTHENTICATION AND AUTHORIZATION

(71) Applicant: QUALCOMM Incorporated, San Diego, CA (US)

(72) Inventor: Subramanian Anantharaman, Tamil Nadu (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/765,682

(22) Filed: Feb. 12, 2013

(65) Prior Publication Data

US 2014/0230018 A1    Aug. 14, 2014

(51) Int. Cl.
G06F 7/04         (2006.01)
H04L 29/06      (2006.01)
H04L 12/28      (2006.01)

(52) U.S. Cl.
CPC ........ H04L 63/0861 (2013.01); H04L 12/2816 (2013.01); *H04L 63/102* (2013.01)

(58) Field of Classification Search
CPC ............ H04L 63/0861; H04L 12/2816; H04L 63/102; H04L 9/0866; H04L 9/3231; H04L 29/06809; G06F 21/32; G06F 21/30; G06F 21/445
USPC .......................................................... 726/4
See application file for complete search history.

(56) References Cited

U.S. PATENT DOCUMENTS

| 6,401,211 | B1 * | 6/2002 | Brezak et al. ...................... 726/5 |
| 7,068,145 | B2 | 6/2006 | Reitmeier |
| 7,602,301 | B1 * | 10/2009 | Stirling et al. ............. 340/573.1 |
| 7,664,961 | B2 | 2/2010 | Blattner et al. |
| 8,299,889 | B2 | 10/2012 | Kumar et al. |
| 8,631,505 | B1 * | 1/2014 | Coronel et al. .................. 726/28 |
| 2003/0212709 | A1 * | 11/2003 | De Schrijver ............... 707/104.1 |
| 2004/0160335 | A1 * | 8/2004 | Reitmeier ...................... 340/825 |
| 2005/0151620 | A1 * | 7/2005 | Neumann ..................... 340/5.52 |
| 2005/0218215 | A1 * | 10/2005 | Lauden ......................... 235/380 |
| 2005/0239454 | A1 * | 10/2005 | Kawashima et al. ....... 455/426.1 |
| 2005/0240959 | A1 * | 10/2005 | Kuhn et al. ..................... 725/25 |
| 2007/0061590 | A1 * | 3/2007 | Boye et al. ..................... 713/186 |
| 2007/0078908 | A1 * | 4/2007 | Rohatgi et al. ................ 707/203 |
| 2007/0081696 | A1 * | 4/2007 | Brennan et al. ............... 382/115 |
| 2007/0288319 | A1 * | 12/2007 | Robinson et al. ............... 705/14 |
| 2008/0016537 | A1 * | 1/2008 | Little et al. ...................... 725/81 |
| 2008/0184352 | A1 * | 7/2008 | Nishiguchi ....................... 726/7 |

(Continued)

FOREIGN PATENT DOCUMENTS

WO    2006046822 A1    5/2006

*Primary Examiner* — Ashok Patel
*Assistant Examiner* — Gary Gracia
(74) *Attorney, Agent, or Firm* — DeLizio Law, PLLC

(57) ABSTRACT

An indication of a configuration request for an electronic device is received. An indication of an access request for the electronic device is received after receiving the indication of the configuration request. The indication of the access request comprises biometric data. The biometric data is validated against previously captured biometric data. If the biometric data is valid based, at least in part, on said validation of the biometric data, a user profile associated with the biometric data is accessed and access to the electronic device is authorized in accordance with the user profile. If the biometric data is not valid based, at least in part, on said validation of the biometric data, a notification that an unauthorized access has been attempted is generated and transmitted.

32 Claims, 5 Drawing Sheets

(56) References Cited

U.S. PATENT DOCUMENTS

| | | | |
|---|---|---|---|
| 2008/0208908 A1 | 8/2008 | Kashyap et al. | |
| 2009/0249079 A1* | 10/2009 | Suzuki et al. | 713/186 |
| 2009/0282241 A1* | 11/2009 | Prafullchandra et al. | 713/156 |
| 2010/0071031 A1* | 3/2010 | Carter et al. | 726/2 |
| 2010/0135542 A1* | 6/2010 | Keepper et al. | 382/124 |
| 2010/0274569 A1* | 10/2010 | Reudink | 705/1.1 |
| 2010/0321151 A1 | 12/2010 | Matsuura et al. | |
| 2011/0000961 A1* | 1/2011 | McNeal | 235/382 |
| 2011/0030044 A1* | 2/2011 | Kranendonk et al. | 726/8 |
| 2011/0138409 A1* | 6/2011 | Svensson et al. | 725/25 |
| 2011/0202982 A1* | 8/2011 | Alexander et al. | 726/7 |
| 2011/0216753 A1* | 9/2011 | Kneckt et al. | 370/338 |
| 2011/0231903 A1* | 9/2011 | Springer | 726/3 |
| 2011/0277025 A1* | 11/2011 | Counterman | 726/8 |
| 2011/0314530 A1 | 12/2011 | Donaldson | |
| 2012/0116918 A1* | 5/2012 | Andersson | 705/26.41 |
| 2012/0162423 A1* | 6/2012 | Xiao et al. | 348/148 |
| 2012/0226434 A1* | 9/2012 | Chiu | 701/117 |
| 2012/0258773 A1* | 10/2012 | Alvarez Rivera et al. | 455/556.1 |
| 2013/0007897 A1* | 1/2013 | Robbins et al. | 726/28 |
| 2013/0047229 A1* | 2/2013 | Hoefel et al. | 726/7 |
| 2013/0127591 A1* | 5/2013 | Shay et al. | 340/5.52 |
| 2013/0160111 A1* | 6/2013 | Orr | 726/19 |
| 2013/0174273 A1* | 7/2013 | Grab et al. | 726/28 |
| 2013/0182279 A1* | 7/2013 | Yano | 358/1.14 |
| 2013/0214935 A1* | 8/2013 | Kim et al. | 340/870.02 |
| 2013/0227651 A1* | 8/2013 | Schultz et al. | 726/4 |
| 2013/0238501 A1* | 9/2013 | Jeronimus et al. | 705/44 |
| 2013/0239206 A1* | 9/2013 | Draluk et al. | 726/19 |
| 2014/0046664 A1* | 2/2014 | Sarkar et al. | 704/246 |
| 2014/0188991 A1* | 7/2014 | Dhara et al. | 709/204 |

* cited by examiner

BIOMETRICS BASED ELECTRONIC DEVICE AUTHENTICATION AND AUTHORIZATION

BACKGROUND

Embodiments of the inventive subject matter generally relate to the field of networks, and, more particularly, to authentication and authorization of home devices.

As electronic devices, such as appliances, become more advanced, many incorporate the ability to be connected to computer networks. Typically labeled as "smart devices," connecting these smart devices to a network allows them to communicate with each other as well as the outside world via the Internet. For example, a refrigerator with a built-in touchscreen and Internet access can be designed to allow access to a database of recipes maintained by a third-party, such as the manufacturer. Or a digital video recorder (DVR) can be designed to allow a person to stream a movie from the DVR to a laptop computer in another room.

SUMMARY

Various embodiments for biometrics-based electronic device authentication and authorization are disclosed. In one embodiment, a first network device receives an indication of a configuration request for an electronic device. Subsequent to receiving the indication of the configuration request from the electronic device, the first network device receives an indication of an access request for the electronic device. The indication of the access request includes biometric data. The biometric data is validated against previously captured biometric data accessible by the first network device. If the biometric data is valid, based on said validating the biometric data against the previously captured biometric data, a user profile associated with the biometric data is accessed and access to the electronic device is authorized in accordance with the user profile. The user profile is one of a plurality of user profiles. If the biometric data is not valid, based on said validating the biometric data against the previously captured biometric data, a notification that an unauthorized access has been attempted is generated and transmitted.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
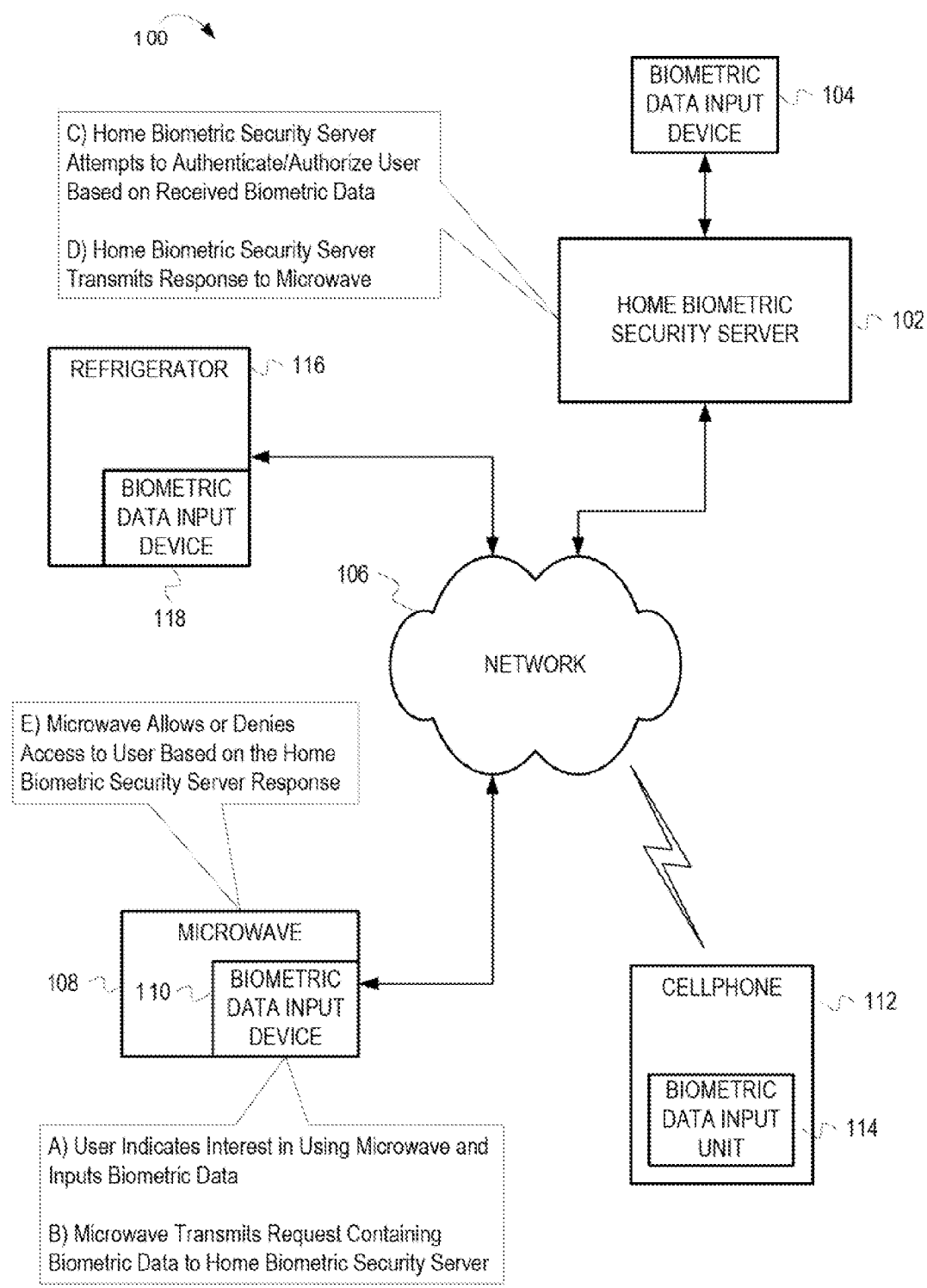
FIG. 1 is an example diagram that depicts the interactions of a home biometric security server and related components to authenticate and authorize a user based on biometric data.

The description that follows includes example systems, methods, techniques, instruction sequences and computer program products that embody techniques of the present inventive subject matter. However, it is understood that the described embodiments may be practiced without these specific details. For instance, although examples refer to fingerprint and voice biometric data, other types of biometric data can be utilized, such as retinal recognitions. Furthermore, the descriptions herein refer to home devices. The descriptions, however, apply to electronic devices, whether home, portable, commercial, etc. The use of home devices is merely intended to make the examples discussed clear. In other instances, well-known instruction instances, protocols, structures and techniques have not been shown in detail in order not to obfuscate the description.

Terminology

The description refers to a "security server." This term is used to refer to a computing system receiving and responding to requests transmitted over a network, such as a local area network (LAN). A security server can embody additional functionality as well, such as functioning as a network router or a network gateway. A network router typically connects multiple components of a network together, directing messages or packets between the components. A network gateway is a device configured to connect two networks, such as a LAN to a wide area network (WAN). In a consumer context, a network gateway generally connects a home network (i.e., private local area network) to the Internet (i.e., WAN). For example, some Internet Service Providers (ISPs) provide customers with a device that includes the functionality of a modem, a gateway and a router. Such a device can also embody the functionality described herein. A security server can also be a standalone device or incorporated into other devices, such as those described above. A security server is not limited to the consumer context, but can also be used in a commercial, or business, context. For example, a security server can be deployed in an office environment, controlling access to devices such as printers, refrigerators, access control devices for doors, etc.

The terms "authentication" and "authorization" are used frequently herein. Generally, "authentication" is used to refer to determining or confirming the identity of a person. For example, the entering of a username and password serves as a way to determine that the user is who they claim to be. Biometric data that is believed to be unique to a particular user or believed unique enough that the chance of two people having the same biometric data is small can be used to authenticate a user, similar to a login and password. "Authorization" generally refers to determining whether a particular user has permission to access an object, such as a data file on a computer or a room in a building, or perform a particular action or operation. Thus, authorization generally occurs after a user has been authenticated, although the two can be combined in some instances. The terms are used as described above herein. However, it should be noted, that the terms "authentication" and "authorization" are often confused when used elsewhere. Therefore the context in which the terms are used elsewhere may be used to determine the intended meaning of the term chosen.

The term "connected" is also used herein, as above when stating that a router connects multiple components of a network together. The term "connected" can mean directly or indirectly coupled as well as communicatively or physically coupled. For example, a first computing system and a second computing system are each physically coupled to the router by networking cables. Because the router allows the first computing system to communicate with the second computing system, the two computing systems are communicatively coupled. Further, a third computing system is connected to the router via a wireless connection, thus making the third computing system and router communicatively coupled. Further, a first component that is "connected" to a second component can be integrated into the second component, or vice versa. Thus, a microphone that is connected to a cellphone can be integrated into the cellphone itself. Components that are connected need not be within close proximity to each other. For example, two computing systems can be connected via the Internet while being thousands of miles apart.

Overview

The ability to control access to home devices can be useful for multiple reasons. For example, preventing a child from accidently turning on an appliance, such as a dishwasher or stove, can have obvious benefits. Controlling access also includes controlling specific activities, such as allowing a user to watch television (TV) while restricting what channels can be watched to prevent the watching of inappropriate content. Although many home devices have features that accomplish these tasks to a certain degree, they can be cumbersome to implement, and are generally implemented on each individual device. For example, devices may use different authentication methods, some of which are more useful than others. While a TV may allow a parent to input a numeric password to prevent unauthorized access to specific TV channels, it may be impractical to include the ability to create, save and enter a numeric password on a dishwasher. Thus, a dishwasher may be relegated to using a physical locking mechanism, which is only successful as long as an unauthorized user does not figure out how the mechanism works, whether accidently or on purpose. Additionally, interfaces for controlling access can be limited by the device itself. Using a remote control to modify a large number of settings on a TV can be cumbersome, while navigating liquid crystal display (LCD) screens on audio equipment to set a maximum volume level can be even more cumbersome.

Home devices can be designed to allow for authentication and authorization over a home network. Each home device can include the capability to capture one or more types of biometric data. The home device transmits the biometric data to a security server, which authenticates the user, transmitting a response back to the home device. The home device can also include information indicating the operation the user is attempting to perform along with the biometric data. The response from the security server back to the home device can include whether the user is authorized to use the device and/or complete the requested operation. The response can also include further information, such as a complete user profile detailing all permitted actions by the user or other combination of available information. The security server stores the user profile in a database or other storage system, and allows modification of the user profile either directly or remotely, including the inputting of biometric data.

The use of biometric data allows for a consistent, easy-to-use authentication mechanism compatible with most home devices. For example, including a user-friendly mechanism for text or numeric entry on a toaster or dishwasher may be impractical. A keypad can take up valuable space, while a compact entry mechanism, such as allowing a user to scroll through individual alphanumeric characters, can be cumbersome to use. However, including biometric input functionality, such as a fingerprint scanner or audio recorder, can take up less space than an alphanumeric display and scrolling mechanism, while being even easier to use than a password. Further, biometric data can provide significantly increased security beyond physical locking mechanisms. Thus, the use of biometric data increases security while also increasing ease of use.

Utilizing a security server simplifies setup and management of the related data. As mentioned above, using a remote control to configure parental guidance features on a TV can be cumbersome. Having a central point for authentication and management also allows a user profile to be setup once, instead of inputting biometric data on multiple home devices. The security server can include a biometric data input device, thus allowing use of the biometric authentication without purchase of a separate biometric data input device. Further, the security server can be configured to transmit notifications to users when a home device is accessed, whether the access was permitted or not.

Biometric Based Security Gateway Example Illustrations

FIG. 1 is an example diagram that depicts the interactions of a home biometric security server and related components to authenticate and authorize a user based on biometric data. FIG. 1 depicts a home biometric security system 100. The home biometric security system 100 includes a home biometric security server (server) 102 coupled with a biometric data input device 104 and a network 106. The home biometric security system 100 also includes two home devices, a microwave 108 and refrigerator 116. Each home device is associated with a biometric data input device 110 and 118. A biometric data input device associated with a home device can be coupled with or integrated into the home device. The home biometric security system 100 is also communicatively coupled with a cellphone 112. The cellphone 112 includes a biometric data input unit 114.

At stage A, a user indicates his/her interest in accessing or operating the microwave 108. The user can indicate his/her interest in a variety of ways depending on the underlying implementation, such as the nature of the microwave 108 and the type of biometric data used. In some implementations, the user can press a designated button on the microwave 108 that indicates the user's interest in accessing or operating the microwave 108. In some implementations, the user can press any button on the microwave 108. For example, the microwave 108 can have a button labeled "Unlock" which the user presses to indicate his/her interest in using the microwave 108. The microwave 108 might not have any designated buttons, but rather the user's interest is inferred by the user pressing any other button, such as one labeled "Cook Time" or "Defrost." In some implementations, the inputting of biometric data serves as the indication of interest. For example, a fingerprint reader can identify when a user presses a finger against the fingerprint reader input without the user pressing another button. Or, the fingerprint reader input can be combined with the button indicating interest, such that when the user uses his/her finger to press the button down, the fingerprint reader is activated. Similarly, the microwave 108 can respond to voice commands, which can serve as the indication of interest and biometric data.

After receiving, or concurrently with, a user's indication of interest in using the microwave 108, the microwave 108 records the user's biometric data. As above, this can occur in a variety of ways. For example, if the user indicates his/her interest in using the microwave 108 by pressing a button, the user may then use the biometric data input device 110 to input his/her biometric data. If the inputting of the biometric data serves as the indication of interest, the biometric data is recorded when the biometric data input device 110 senses an attempt to input biometric data. Furthermore, the recording of the biometric data will vary based on the type of biometric data used. If fingerprints are used, then the biometric data can be recorded by scanning, photographing or using other means to record a fingerprint. If voice biometric data is used, a microphone can be used to record the user's voice. Regardless of the type of biometric data used, the biometric data is recorded, converted and/or stored in a machine-readable format suitable for the particular implementation. For example, a fingerprint can be stored as an image file or a data file indicating a set of points within a two dimensional space, a voice biometric data can be stored as a digital audio file, etc. The microwave 108 can be implemented such that it does minimal processing of the biometric data, thus acting only as an input device. In this case, the server 102 can perform any additional processing to the biometric data. The microwave 108 can also be implemented to process the biometric data to reduce the amount of network traffic, load on the server 102, etc. In this case, the server 102 may do little or no processing to the biometric data.

At stage B, the microwave 108 transmits a request including the recorded biometric data to the server 102 over the network 106. The request can include other information, such as a device identifier, operation identifier, etc. For example, the microwave 108 can be implemented such that the user is either authorized to use the microwave 108 or not, with no capability to authorize specific operations. Thus, the request might only include the biometric data and an identifier identifying the microwave 108. A home device can also be implemented such that users are only authorized to perform a subset of operations available to the home device. For example, if the home device is a digital video disc (DVD) player, a user can be authorized to watch a DVD in the DVD player but not authorized to eject the DVD. Thus, the request can include an identifier identifying a specific operation that the user is attempting to perform.

Furthermore, multiple requests can be used. For example, a home device can be a device in which a user interacts with frequently in one session, such as a television. Instead of sending a request with the biometric data and operation identifier each time the user interacts with the television, the requests can be broken down into authentication requests and authorization requests. The microwave 108 and server 102 can be implemented such that the microwave 108 sends the biometric data with an initial authentication request, and the results of the authentication are cached. Along with notification that the user is authenticated, the server 102 sends a user identifier to the microwave 108. The microwave 108 then sends authorization requests to the server 102 each time the user interacts with the microwave 108. The authorization requests can contain the user identifier as well as the operation identifier. A home device may only send one authorization request for each type of operation. In other words, if the server 102 indicates to a home device, a television, that the user is authorized to change channels, the television might cache the authorization so that it does not have to request authorization each time. This reduces potentially unnecessary network traffic and load on the server 102 because the authentication and authorization statuses might not change frequently. Thus, the television might only update authentication and authorization statuses for particular users and operations on a periodic basis, such as daily. Additionally, the server 102 can be implemented to send notifications to all connected home devices when either authentication or authorization statuses change. The server 102 can send an indication indicating that the home devices should flush their cache, or the home server 102 can indicate the specific changes. Some types of home devices, such as a dishwasher, may be used infrequently enough that no caching is used and only authentication requests are made.

At stage C, the server 102 has received a request from the microwave 108 attempting to authenticate or authorize the user. As discussed above, the server 102 can be implemented to handle multiple types of requests, such as authentication requests and authorization requests. Thus, the server 102 determines the type of request. If the server 102 determines the request is an authentication request, the server 102 can extract the biometric data from the request. The server 102 can do any processing to the biometric data not done by the microwave 108. Once the biometric data is in an appropriate format, the server 102 searches a database for matching biometric data. The database includes user information, such as representative biometric data and permissions (collectively referred to as a user profile), discussed in detail below. If the server 102 finds biometric data in the database matching the received biometric data, the server 102 has matched the user supplying the biometric data with a user profile in the database, thus authenticating the identity of the user. If the server 102 does not find biometric data in the database matching the received biometric data, the server 102 has not authenticated the identity of the user.

If the server 102 determines that the request is an authorization request, the server 102 determines whether the user is authorized to perform a particular action. The server 102 extracts a user identifier or biometric data from the request. The server 102 uses the user identifier or biometric data to determine the user and look up the user profile in the database. The server 102 determines what operation is being attempted by extracting an operation identifier from the request. The server 102 uses the operation identifier and the user profile to determine whether the particular user is authorized to perform the particular operation. The server 102 may also use other information, such as a device identifier, as well. For example, a user profile may include a table indexed by device identifier and operation identifier pair with a corresponding Boolean value indicating whether the user is authorized to perform the particular operation on the particular device. The server 102 looks up the Boolean value corresponding to the device identifier and operation identifier from the request. If the Boolean value is "true," the user is authorized to perform the particular operation on the particular device. If the Boolean value is "false," or the row does not exist, the user is not authorized to perform the particular operation on the particular device.

As discussed above, the authentication and authorization requests can be combined. In such cases, the actions described above pertaining to authentication and authorization can be combined as appropriate. Additionally, some implementations may utilize different requests not specified above, and the server 102 can be implemented to appropriately handle such other requests. For example, the gateway 102 can be implemented to handle requests for updating cached user profiles, as discussed below.

At stage D the server 102 transmits a response to the microwave 108. The response can vary depending on the implementation. The response to a request may only contain a value, such as a Boolean value, indicating whether the user was properly authenticated or authorized, depending on the request type. The response can also contain a user identifier, a user profile, a request identifier, etc.

At stage E, the microwave 108 allows or denies access to the user based on the server 102 response. If the microwave 108 is implemented such that individual operations, not merely access, can be authorized, the requested operation may be allowed or denied without allowing or denying the user access or ability to perform other operations. The microwave 108 may also cache the response or otherwise store the information contained in the response as discussed above.

In some implementations, a notification can be sent by the server 102 upon a failed authentication or authorization. For example, if a user attempts to change the channel on a television to a channel for which they are not permitted to access, a notification can be sent to a designated user providing the details of the unauthorized access. The notification can take any appropriate form. For example, the notification can be an e-mail message, a text message sent to the cellphone 112, a notification that is displayed on the screen of an electronic device (such as a television), etc. The server 102 can be configured to allow notifications to go to any combination of users of the home biometric security system 100. Further, the server 102 can be configured to restrict the notifications to be sent only upon accesses to certain devices or operations. For example, the server 102 can be configured to send a notification when a user attempts to access a prohibited channel on a television, but not send a notification when a user attempts to use the dishwasher and is not permitted. Further, notifications can also be sent when users are successfully authenticated or are authorized to perform the requested operation.

As discussed above, a home device can receive an indication that the user is interested in accessing or operating the home device in a variety of ways. One example given was the user pressing a button on the device. However, many variations are possible. For example, a button or the biometric data input device 110 can exist separately from the home device. The system can be designed such that there is a control panel, containing appropriate buttons and the biometric data input device 110, for a set of home devices. For example, a kitchen can contain multiple home devices, such as the microwave 108, the refrigerator 116, a dishwasher, an oven, and a toaster. Instead of including a biometric data input device on each home device in the kitchen, there can be a single control panel containing the biometric input device 110. The control panel can be implemented as an intermediary between the server 102 and each individual device. The control panel can accept input to identify which appliance the user is interested in using. The user enters input that identifies a particular home device and inputs his/her biometric data using the biometric data input device 110 on the control panel similarly to that described above. The control panel communicates with the server 102 and then forwards the server 102 response to the appropriate home device, or otherwise communicates to the appropriate home device that it should be operable. Additionally, the control panel could function similarly to a multi-function home device, such as a television. A user could be granted or denied use of any or all individual device(s) attached to the control panel. When the user inputs his/her biometric data, the control panel can request authorization for each home device connected to it, and then notifies each appropriate device that it should be operable. Thus, if the user is attempting to cook, the user only has to request authorization once, and is allowed access to the microwave, stove, and oven. Furthermore, this can reduce the complexity and cost of updating home devices to integrate with a home biometric security system. Because the single control panel communicates with the server 102, the individual home devices only have to be updated to include functionality that allows the home devices to be operable or not operable based on an electrical input. Many home devices already include similar features, making basic integration with a home biometric security system simple. Furthermore, the home device 108 can communicate with the control panel utilizing a wireless technology, such as the Bluetooth® wireless protocol.

In some implementations, the cellphone 112 can be used to authenticate and authorize a user to use a home device. For example, the user downloads and installs an application to the cellphone 112. The application connects to the server 102 and downloads a list of home devices connected to the server 102. The user selects the home device from the list of devices and inputs his/her biometric data via the biometric data input unit 114. The biometric data input device 114 can be coupled to the cellphone 112 using a wired or wireless connection. For some biometric data types, such as voice, the cellphone 112 functions as the biometric data input device 114 without modification. After the user inputs his/her biometric data, the application then transmits the request to the server 102. The server 102 can then send the response to the home device 108 and/or the cellphone 102.

In some implementations involving a cellphone 112 and an application installed on the cellphone 112, instead of downloading a complete list of home devices from the server 102, the application downloads only a list of home devices the user is authorized to access. For example, the user indicates that the application should connect to the server 102. The user inputs his/her biometric data, which is used to retrieve the user's user profile indicating the actions they can perform. Then the user can indicate the actions the user wants to perform or home devices the user wants to access using the cellphone 112. This is similar to the functionality described above where the home device 108 caches the authentication and/or authorization status. The application would retrieve updates to the list from the server 102 at periodic intervals or if the server 102 indicates that the user is making a request that is denied.

The server 102 is depicted as being connected to the network 106, similar to other devices. However, the server 102 could also be a network hub, such as a router (wired or wireless). The server 102 could also be a gateway, such as a device used to connect Internet service to a home network. In this manner, the server 102 could be the central point of the network, with the home devices connected to it.

The network 106 can be a wired network, wireless network or combination thereof. The network 106 can be a LAN, a WAN, a home area network or other suitable network. A home device and server 102 can use any suitable existing or future network protocol to communicate. The server 102 can implement an application programming interface (API), thus allowing home devices designed to implement the API to utilize biometric data for authentication or authorization. The communications can be accomplished using multiple protocols. For example, the API can be built on top of the HTTP protocol, or a broadcast network protocol can be used for some of the communications while a file transfer protocol is used for others. Furthermore, the network 106 can consist of multiple interconnected networks.

Configuration of a home device, such as connecting it to the network 106 can be accomplished in a variety of ways. The home device can include a connection for a wired network, such as an Ethernet connection. The home device can be designed to join the network 106 automatically when a network cable is plugged into the home device. The home device can also support a wireless network connection by including a wireless network adaptor or including an input/output port compatible with a wireless network adaptor. The home device can include a user interface for configuring the home device for a wired or wireless network connection, or can allow a computer to be coupled with the home device to allow configuration of the home device.

Configuring a home device to function with the server 102 can also be accomplished in a variety of ways. In some implementations, the home device can implement a protocol that allows the home device to configure itself with the gateway 102, such as "zero configuration networking" Once connected to the network 106, the gateway 102 automatically recognizes the home device and is able to determine the operations available on the home device. Thus, when the home device is connected to a network with the server 102, the home device automatically becomes available for configuration by an administrator, as discussed below. The protocol can be an existing protocol or one developed for this, or another purpose. In some implementations, the home device can be configured to work with the server 102 manually. For example, the network information of the home device, such as the IP address, can be entered into the server 102, allowing the home device and server 102 to communicate with each other. The operations available on the home device can also be entered manually into the server 102.

A home device and server 102 can be implemented such that a default user profile is generated when the home device is initially configured to work with the server 102. For example, the home device can wait for a user to enter in his/her biometric data before sending a notification to the server 102 that the home device has been connected to the network 106. The server 102 can refuse to acknowledge the home device unless the biometric data corresponds to a user already stored in the server 102. This allows a user to access and use the home device once it is added. The server 102 can further restrict which users can allow a home device to be configured initially to administrators. This prevents a user from adding a new home device in order to bypass restrictions on the home device 108. For example, if a user is not allowed to access a particular channel on a television, the user may attempt to add another television to the network in an attempt to bypass the restrictions on the previously added television. However, if access to new devices is restricted to an administrator, the user adding the new television would not be able to access the device until permissions were setup by the administrator.

The configuration of users on the server 102 can take many different forms and be extended in many different ways. For example, user profiles can be assigned to a group, and permissions inherited by the individual user profiles from the group. Thus, an administrator can designate a "child" group, and deny access to certain channels on a television to any user who is part of that group. Then, the administrator can add each user profile for a child to that group, and the added user profiles will contain the same restrictions. Similarly, access can be granted based on a user profile belonging to a particular group. Furthermore, various home devices can belong to different groups, allowing the administrator to grant or deny access to sets of home devices instead of individually.

Additionally, the server 102 can be implemented to allow transferable permissions. For example, it would be time consuming to set up a brand new profile for each guest that came over and wanted to use a home device. Instead, the server 102 can allow a particular user to transfer his/her permissions to a guest user. If the guest was a guest of a particular user, the guest would not receive permissions greater than that of the particular user. Furthermore, a user can be designated as a device owner, restricting use of that particular device to the particular user. The device owner, however, can designate that another user can also use that particular device temporarily or permanently.

The implementations described above are not mutually exclusive. For example, one device within the home biometric security system 100 may utilize a combined authentication/authorization request, while another utilizes individual authentication/authorization requests. A kitchen may include a single control panel with multiple home devices connected to it, while the control panel, a television, and a DVD player are connected to the server 102, all of which are controlled by the cellphone 112. Furthermore, the inventive subject matter can be implemented alongside existing security mechanisms. For example, a safe may include a keyed lock that must be physically unlocked while also requiring the input of biometric data.

Figure 2:
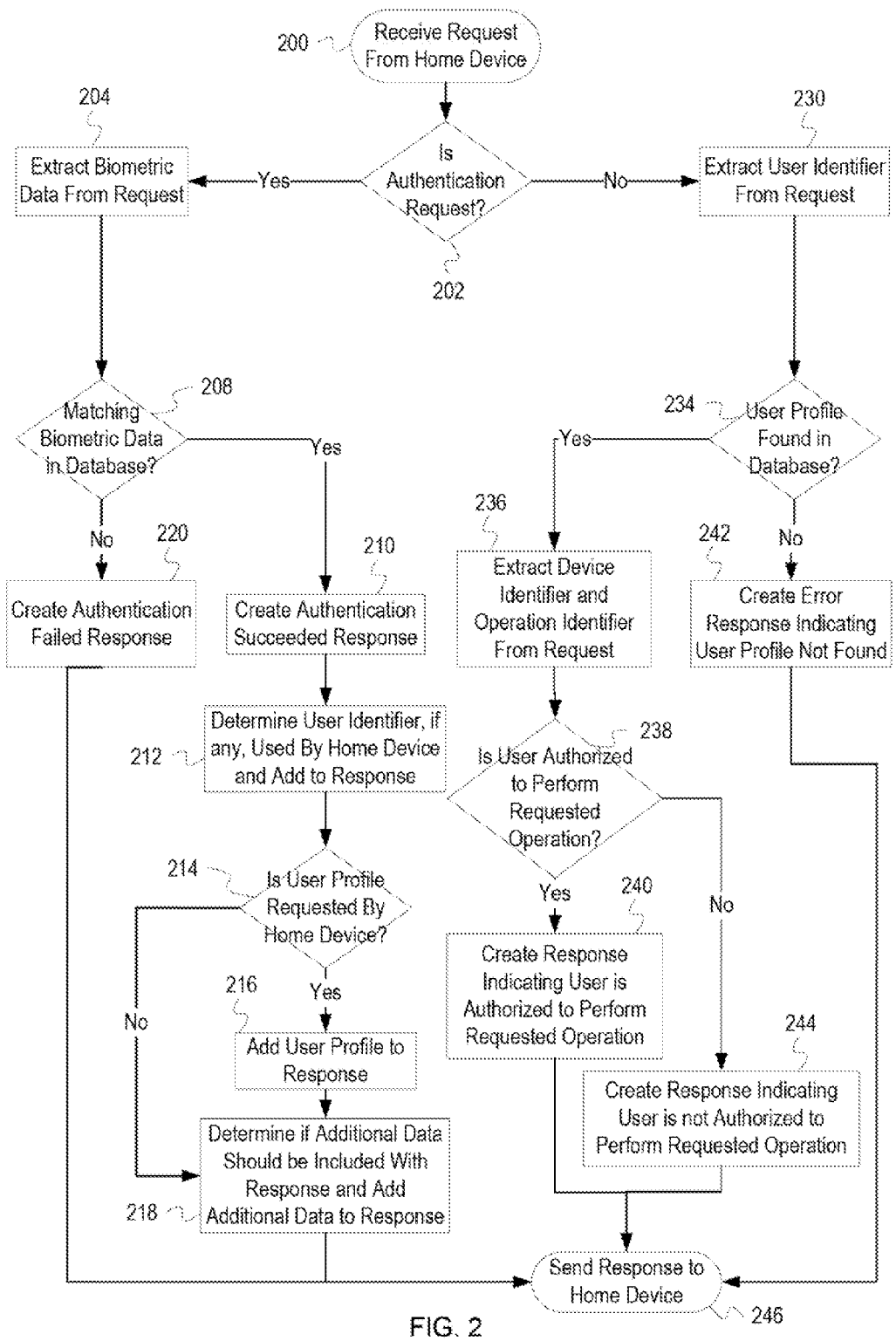
FIG. 2 depicts a flowchart of example operations for authenticating and authorizing a request from a biometric input-enabled home device.

FIG. 2 depicts a flowchart of example operations for authenticating and authorizing a request from a biometric input-enabled home device.

At block 200, a home biometric security server (server) receives a request from a home device. The request is received over a network connecting both the server and the home device. The home device can transmit the request utilizing a protocol implemented by the server. The server can implement an existing protocol, such as the HTTP protocol or implement a new protocol designed for a particular purpose. After receiving the request, control then flows to block 202.

At block 202, the server determines whether the request is an authentication request. If the request is not an authentication request, it is assumed to be an authorization request for the purposes of this example. Actual implementations can also implement many other request types, such as a request to initiate configuration between the home device and the server, a request to update a user profile or other cached information, etc. Additionally, in some implementations the authentication and authorization requests are a single combined request. In some implementations the authentication and authorization requests can either be combined or separate. How the server determines whether the request is an authentication request can vary between implementations. For example, if utilizing the HTTP protocol, the server might look at an HTTP header field to determine the request type. If the server determines that the request is an authentication request, control then flows to block 204. If the server determines that the request is not an authentication request, control then flows to block 230.

At block 204, the server extracts the biometric data from the request. The biometric data can be embedded in the request using multiple techniques. For example, the biometric data can be embedded directly as binary data representing an image or audio file. The biometric data can be a textual representation of particular points on a fingerprint. The biometric data can be included in a distinct request from the initial request. For example, the home device can send a request requesting authentication and indicating that the biometric data will be transmitted in a separate request, perhaps using a different protocol. Additionally, the use of two individual requests can be implicit based on the design of the server. After the server extracts the biometric data from the request, control then flows to block 208.

At block 208, the server determines if biometric data matching the extracted biometric data exists in a database associated with the gateway. The server includes a database of user profiles with associated biometric data. The technique used to look up the user profile associated with the biometric data can vary between implementations. For example, the user profile can be indexed in the database by a representation of the associated biometric data. The server can then convert the extracted biometric data into the form utilized by the database and look up the user profile based on the indexed representation of the user profile. The server may include the biometric data associated with the user profiles as individual files. The server can run a comparison between the extracted biometric data and the stored biometric data, determining whether there is a match. The database can then contain an identifier indicating which biometric data file the user profile is associated with, which can be looked up by the server based on the comparison. The comparisons or index searches may not look for exact matches, but may look for matches that are within a certain margin of error. If the server determines that the user profile exists in the database, control then flows to block 210. If the server determines that the user profile does not exist in the database, control then flows to block 220.

At block 210, the server creates an authentication succeeded response. The response can include a variety of information, such as a number identifying the request it is in response to and information about the user. Although depicted as being created before determining the information to include with the response, the response can be created after determining and collecting all information to be included in the response. After creating the authentication succeeded response, control then flows to block 212.

At block 212, the server determines the user identifier used by the home device, if any, and includes it in the response. The home device may not store any information about the user. A dishwasher, for example, may request authentication before being turned on, and allow access until the wash cycle is completed. After the dishwasher has completed the cycle, it requests authentication before the next time it is turned on. Thus, it does not store any user information. However, some home devices, such as a television, may send messages beyond an initial authentication message, and thus may request a user identifier. A user identifier may be smaller in size than biometric data, decreasing the amount of memory used on the home device and decreasing network traffic. After determining the user identifier used by the home device, if any, control then flows to block 214.

At block 214, the server determines if the home device has requested a user profile. The home device can request that the server transmit a copy of the user profile back in the authentication response. This allows the home device to send fewer requests to the server, as described above. The home device can specify whether it requests the user profile by setting a particular field in the initial request or other method dependent on the implementation. The server can also be designed to include the user profile in all authentication requests. If it is determined that the user profile is requested by the home device, control then flows to block 216. If it is determined that the user profile is not requested by the home device, control then flows to block 218.

At block 216, the server adds the user profile to the response. The entire user profile or a subset of the user profile can be included in the request. As discussed above, the user profile can include a variety of information, including various pieces of information about the user as well as permissions for all devices connected to the network. The requesting home device might only use a small subset of the data, and as such, can request only the information it uses. For example, the home device can request only the user identifier and the set of permissions related to the requesting home device. After adding the user profile to the response, control then flows to block 218.

Control also flows to block 218 if the server determined that the user profile was not requested by the home device at block 214. At block 218, the server determines if any additional data should be included with the response and adds the additional data to the response. As described above, the response can include a variety of data depending on the implementation. For example, the response can include various metadata, such as how long the home device should keep information cached, information about the protocol used, etc. This additional information, or some subset of the additional information, might be include in all responses, or might be requested by the home device. After determining if additional data should be included with the response and adding the additional data to the response, control then flows to block 246.

Control flowed to block 220 if the server determined that the user profile was not in the database at block 208. At block 220, the server creates a response indicating that the authentication failed. The server can include additional data, such as a specific error code and error message with the response. After creating the response indicating that the authentication failed, control then flows to block 246.

Control flowed to block 230 if the server determined that the request was not an authentication request at block 202. At block 230, the server extracts the user identifier from the request. If the request is not an authentication request, it is assumed that the request is an authorization request for this example. The home device could request a user identifier to be included with the authentication response. If the home device requested a user identifier, typically it would store the user identifier and include it with subsequent authorization requests. The server implementation will generally specify how the user identifier is included in a request, which can vary between implementations. The home device could also be implemented such that biometric data serves as the user identifier for every request. Thus, the user identifier can be extracted similarly to how the biometric data is extracted at block 204. After the user identifier is extracted from the request, control then flows to block 234.

At block 234, the server determines whether the user profile associated with the user identifier exists in the database. If the user identifier is biometric data, this can be accomplished as described for block 208. For other types of user identifiers, the server will typically perform a query on the database for any profiles associated with that user identifier. The user identifier will typically be a unique value that allows for quick and simple database lookups for the associated user profile. If the user profile is found in the database, control then flows to block 236. If the user profile is not found in the database, control then flows to block 242.

At block 236, the server extracts the device identifier and operation identifier from the request. The device identifier identifies the specific home device sending the request, allowing the server to look up the permissions specific to that device. The operation identifier identifies the specific operation the user is attempting to perform on the requesting home device, allowing the server to look up the permission specific to that operation. Some home devices may not include an operation identifier, in which case the permission related to the device identifier is whether the device can be operated by the particular user or not. After extracting the device identifier and operation identifier from the request, control then flows to block 238.

At block 238, the server determines whether the user is authorized to perform the requested action. The server looks up the user permissions associated with the device identifier. The server can be implemented such that if there are no permissions associated with the device identifier in the user profile, the user does not have permission to perform any operations on the home device. If there are permissions associated with the device identifier but no operation identifier was included in the request, the server can be implemented to indicate that the user has permission to operate the home device. If no operation identifier is included, the server can also be implemented to read a single permission value associated with the device identifier and determine whether the user is authorized to use the home device based on the single permission value. If an operation identifier is included, the server can read a permission value associated with the device identifier and the operation identifier to determine whether the user has permission to perform the specified operation. The permissions can be stored in a variety of ways, such as a multidimensional table or single dimensional table indexed by a combination of the device identifier and operation identifier. The permissions can be stored in multiple formats, including Boolean values or integers. The permissions are not restricted to true and false values. For example, a permission can indicate the maximum volume level a user can turn an audio receiver up to, or a permission can comprise a set of values indicating the channels the user is permitted to watch on a television. The specific implementation of the permissions can vary based on a number of factors, such as the types of home devices expected to be connected to the server and the level of complexity determined to be appropriate for users of the server. If the server determines that the user is authorized to perform the action, control then flows to block 240. If the server determines that the user is not authorized to perform the action, control then flows to block 244.

At block 240, the server creates a response indicating the user is authorized to perform the requested action. The response can include information similar to that discussed regarding other responses, such as a request identifier and a user identifier. The response can also include other metadata or information depending on the specific implementation. After creating the response indicating the user is authorized to perform the requested action, control then flows to block 246.

Control flowed to block 242 if the server determined that the user profile was not found in the database at block 234. At block 242, the server creates an error response indicating that the user profile was not found. The error response, similar to previously discussed responses, can contain additional metadata and information depending on the specific implementation. For example, the error response might include an error message as well as an error number. After creating the error response, control then flows to block 246.

Control flowed to block 244 if the server determined that the user was not authorized to perform the requested operation at block 238. At block 244, the server creates a response indicating that the user is not authorized to perform the requested operation. As with previously discussed responses, the response can include additional metadata and information depending on the specific implementation. For example, the request can include the operation identifier and the permission value associated with the device identifier and the operation identifier. After creating the response indicating that the user is not authorized to perform the requested operation, control then flows to block 246.

Control flowed to block 246 from blocks 220, 218, 240, 242, and 244. At block 246, the server sends the response to the home device. The home device can be identified by a device identifier as described above. The server can look up information associated with the home device in a database, including information used to communicate with the home device, such as the IP address. The server may also be able to determine the information used to communicate with the home device from the request. The server can be implemented to send the response using the same protocol as used for the request or a different protocol. After sending the response to the home device, the process ends.

Although the above example discusses multiple responses, the server can be implemented such that one type of response is used with different fields in the response set to different values based on the request. For example, the response can include a field indicating the type of response. The response can include a field indicating success or failure, with an additional field reserved for specific messages from the server. The variations available when implementing a communications protocol or other protocol as described above are numerous. Thus, the above example does not limit the inventive subject matter.

Figure 3:
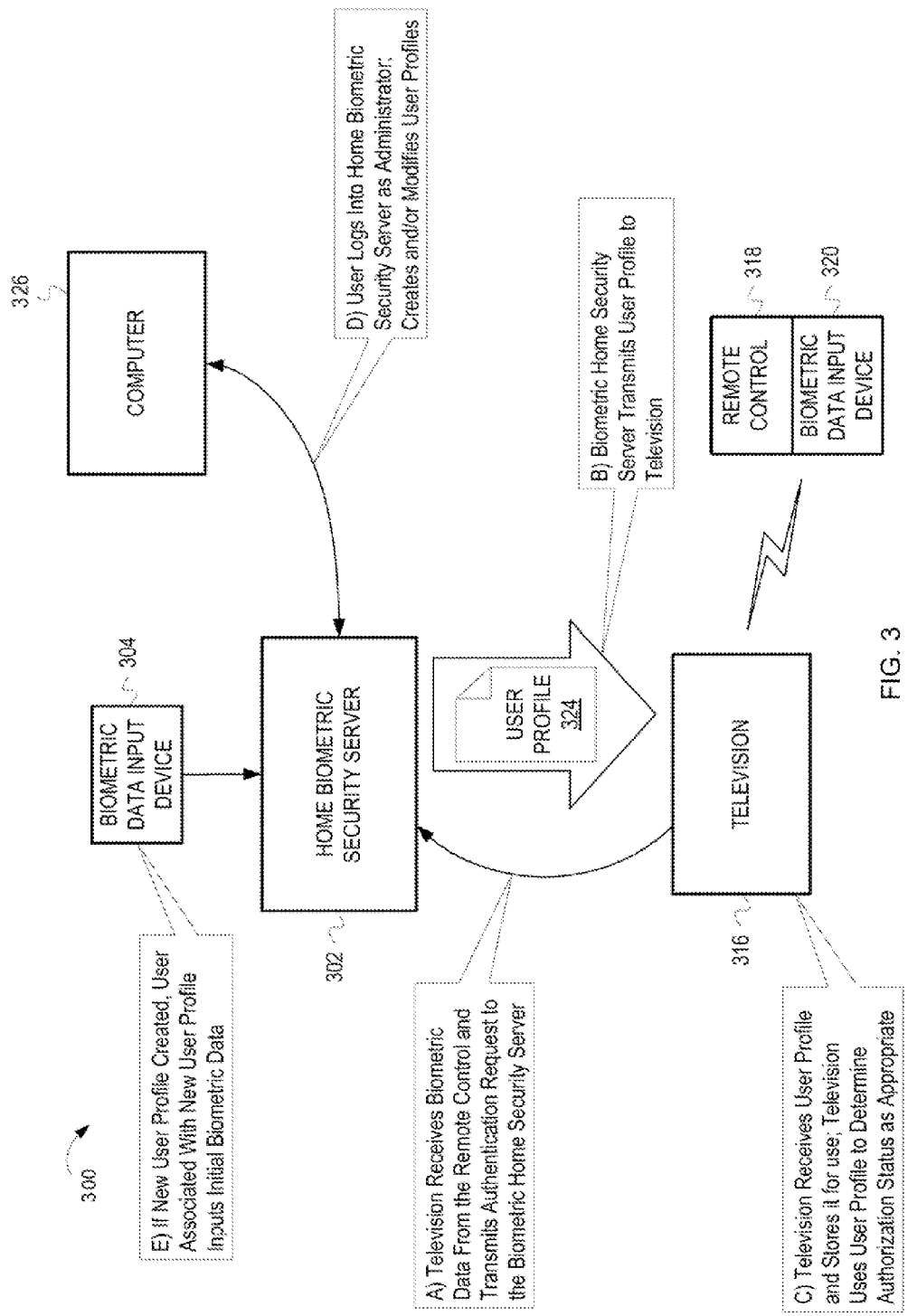
FIG. 3 is an example diagram that depicts the interactions of a biometric home security server and a home device that utilizes a user profile.

FIG. 3 is an example diagram that depicts the interactions of a biometric home security server and a home device that utilizes a user profile. FIG. 3 depicts a home biometric security system 300, including a server 302 and a television 316. The television 316 is coupled with a remote control 318. The remote control includes a biometric data input device 320. The home biometric security system 300 also includes a computer 326 and a biometric input device 304. The computer 326 and the biometric input device 304 are coupled to the server 302.

At stage A, the television 316 receives biometric data from the remote control 318 and transmits an authentication request to the server 302. As described above, biometric data input devices can be coupled to home devices in a variety of ways. For some home devices that are operated by remote control, such as a television, integrating the biometric data input device into the remote control can increase the convenience to the user. In the case of the television 316, if the biometric data input device 320 were integrated into the television 316 or connected via a cable, the user would walk to the television 316 each time biometric data was to be input.

Other than having the biometric data input device 320 integrated into the remote control 318, the television 316 operates similarly to the home device described above. The television 316 generates and transmits a request containing the biometric data to the server 302. The request includes an indication that the television 316 has functionality that allows the television 316 to work with a user profile.

At stage B, the server 302 authenticates the user using the biometric data as described above. The server 302 recognizes that the television 316 has functionality allowing the television 316 to work with a user profile. Thus, after the server 302 determines that the user exists in the server 302 database, the server 302 reads the user profile 324 associated with the biometric data from the database. The server 302 then transmits a response to the television 316, and includes the user profile in the response. If the user is not authenticated, the server responds as described above.

The user profile 324 can contain a variety of information, including details about the user, such as name, age, contact information, user role, etc. The user profile 324 can also contain indications of devices the user is authorized to use, plus a set of permissions indicating what operations the user is permitted to do on each device. The user profile 324 could be implemented in a manner similar to an access control list. The user profile 324 can contain other information depending on the implementation, and could also be in an extensible format, allowing different implementations to include additional information while maintaining compatibility with other implementations.

The server 302 can be implemented such that the response contains only information relevant to the requesting device. The requesting device, such as the television 316, can include a list of only the pieces of data it will use. For example, a device with only a small display, such as an audio device, may not need the name of the user, while the television 316 might display the user name. In particular, instead of sending the full user profile 324, including all permissions for all home devices, the server 302 can just send the permissions related to the television 316. In addition to the user profile 324, the request can include other information, such as the names of administrators and metadata about the server 302 or the home biometric security system 300.

When the television 316 receives the user profile 324, the user is authorized. The television 316 stores the user profile 324 in internal storage. Anytime the user attempts to perform an operation on the television 316, such as changing the channel, increasing the volume, etc., the television 316 can perform a lookup in the user profile 324 to determine whether the user has permission to perform the operation. This results in less network traffic and quicker response time. For example, if the television 316 did not store the user profile 324, each time the user changed a channel, the television would send a request to the server 302 to determine whether the user was authorized to watch the channel being changed to. Depending on network traffic, the length of time between the user initiating an operation at the television 316 and the television 316 receiving the authorization may present a noticeable lag in response time. With the user profile 324 stored on the television 316 itself (or at least the permissions of the authenticated user for the television 316), the television 316 can operate in accordance with permissions stored locally/internally, reducing the length of time between the user initiating an operation and the television 316 determining whether it can proceed with the operation.

However, caching the user profile 324 on the television 316 can result in the permissions being out of sync with the user profile on the server 302. For example, if an administrator adds the ability for a user to watch a channel that was previously denied, the user cannot watch that channel until the copy of the user profile 324 stored on the television 316 is updated. The impact of a stale copy of the user profile 324 can be reduced using a variety of techniques. First, the television 316 can send a request to the server 302 periodically and receive an updated profile. For example, the television might send a new request once an hour or after the user makes twenty-five operation requests. Second, the television 316 can include a mechanism in which the user indicates that the user profile 324 should be updated. Third, each time the user profile 324 is updated on the server 302, the server 302 can then send the updated user profile 324 to all connected devices. Further, a gateway server can maintain flags/timestamps that indicate transmission of permissions or a user profile to a home device. When a permission is changed, the gateway will push the change to the home device or notify the home device depending upon the flags/timestamp and lifespan of authentications and/or authorizations. Other techniques can be employed as well, and can vary based on the individual implementation.

At stage D, a user logs into the server 302 as an administrator and creates or modifies user profiles. The administrator logs into the server 302 remotely from the computer 326 over a network. In some implementations, the server 302 has a display and user interface allowing for account management and configuration changes directly on the server 302. In some implementations, the server 302 allows for account management and configuration changes directly on the server 302 while also allowing management from a separate computer. The server 302 can restrict remote access from the computer 326 to instances when the computer 326 is on a local area network with the server 302. The server 302 can also allow remote access from the computer 326 when the computer 326 is not on a local area network with the server 302, such as over the Internet. The server 302 can restrict remote access to the computer 326, or can allow remote access from any computer as long as the user supplies the correct credentials, or can restrict remote access to a set of computers designated by an administrator.

The server 302 provides user interfaces for creating and modifying user profiles. The interface for creating a user profile can be the same or substantially similar to that of modifying user profiles. Multiple user interfaces for each can be provided. For example, the server 302 can include a "basic" user interface that takes an administrator through a subset of options available for user profiles. The server 302 can provide an "advanced" mode that allows the administrator to select from more options.

As described above, a user profile can contain a variety of information. For example, the user profile can contain information such as the user's name, biometric data, contact information, user role and home device permissions. The user role can be used to specify whether the user associated with the user profile is an administrator or not. The home device permissions can include whether the user is authorized to use a particular device, and if so, what operations on the home device the user is authorized to perform.

At stage E, a user associated with a new user profile inputs biometric data using the biometric input device 304 coupled with the server 302. The biometric data input device 304 can be integrated into the server 302. The biometric data input device 304 can be coupled with the server 302 by a cable, coupled to the computer 326, or can be coupled to either the server 302 or the computer 326. Additionally, the biometric input device 304 can be integrated with, or coupled to, a home device.

A user associated with a new user profile can indicate to the server 302 that the user is inputting biometric data. For example, the administrator can indicate that the next biometric data received by the server 302 from a particular biometric data input device is to be associated with a particular user profile. Additionally, a user can indicate to the server 302 that the biometric data is to be stored for association with a user profile in the future. For example, the user can press a button on the server 302 and input his/her biometric data using the biometric data input device 304. The server 302 stores the biometric data as being available to be associated with a user profile. At a later point in time, an administrator creates a user profile and associates the biometric data with it. The gateway 302 can be configured to send a notification to an administrator upon receiving biometric information that does not match biometric data in the database, as described above. The gateway 302 can further be configured to allow the administrator to view or listen to the biometric data (depending on the biometric data type) and create a profile based on recognizing that the biometric data belongs to a particular user.

Figure 4:
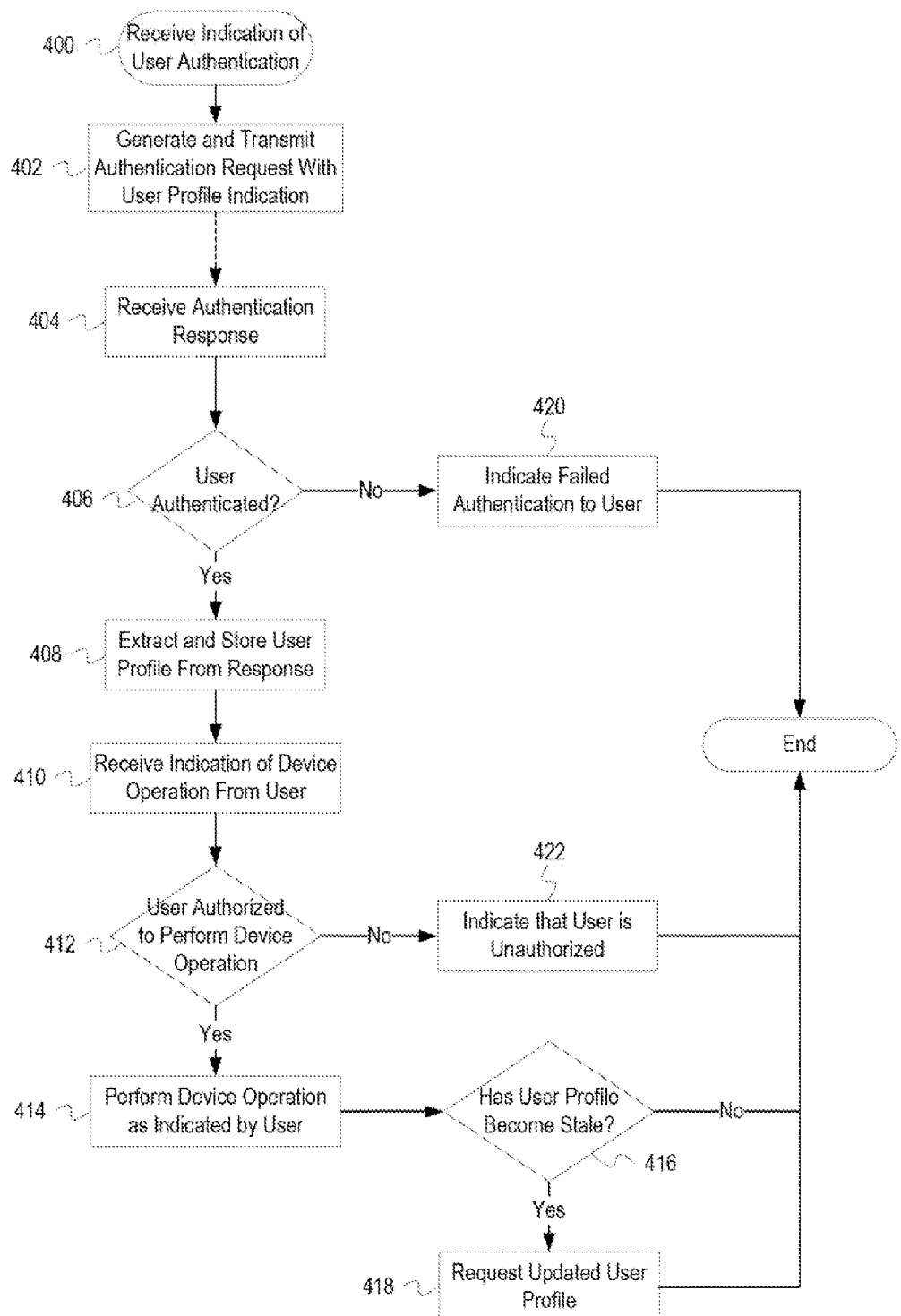
FIG. 4 depicts a flowchart of example operations for a home device utilizing a user profile associated with a biometrically authenticated user.

FIG. 4 depicts a flowchart of example operations for a home device utilizing a user profile associated with a biometrically authenticated user.

At block 400, the home device receives an indication of user authentication. An indication of user authentication can include an attempt to input biometric data using a biometric data input device or the pressing of a button on the home device. If the indication is in a form that does not include the inputting of biometric data, the home device enables a biometric input device and waits for the user to input his/her biometric data. After receiving an indication of user authentication, control then flows to block 402.

At block 402, the home device generates and transmits an authentication request that also requests the user profile associated with the authenticating user. The home device generates an authentication request as described above. The home device includes an indication that indicates to the home biometric security gateway that the home device requests the user profile of the authenticating user. In other words, the home device requests the user profile of the user associated with the biometric data included in the authentication request.

The home device transmits the generated request as described above. After generating and transmitting the request, control then flows to block 404.

At block 404, the home device receives the response associated with the authentication request transmitted at block 402. The authentication response is substantially similar to that described above. For example, it can include a request identifier indicating the authentication request it is associated with, a user identifier, an indication that the user authentication failed, etc. After receiving the response to the authentication request, control then flows to block 406.

At block 406, the home device determines whether the user is authenticated or not. The manner in which the home device determines whether the user is authenticated or not can vary between implementations. For example, the format of the response can vary between implementations. Generally, the home device will inspect a field embedded in the response and determine whether the value in the field indicates that the user was properly authenticated or not. If the home device determines that the user was authenticated, control then flows to block 408. If the home device determines that the user was not authenticated, control then flows to block 420.

At block 408, the home device extracts and stores the user profile from the authentication response. The user profile can be embedded in the authentication response in a variety of ways and can vary between implementations. For example, the user profile can be stored using binary data or textual data. The representation can vary based on what information is included in the user profile, as well as how the user permissions are defined. The home device can store the user profile in a variety of ways as well. For example, if the home device only stores the user profile for a short period of time, the home device can store the user profile in a small amount of volatile memory, such as RAM. For longer term storage, the home device can store the user profile in non-volatile memory, such as a hard disk or flash storage. In some implementations, the user profile is not stored at all. After extracting and storing the user profile, control then flows to block 410.

At block 410, the home device receives an indication of a device operation request from the user. For example, a device operation for a television can be a request to change the channel. A device operation for a dishwasher can be a request to turn the dishwasher on. The home device receives the indication in a manner that is appropriate to the implementation. For example, a request to change the channel of a television can come from the user pushing a button on the remote control or the television itself. A request to turn on a dishwasher can come from the pressing of a button or an indication that the dishwasher door is locked and a dial is in a particular position. After receiving the indication of the device operation request from the user, control then flows to block 412.

At block 412, the home device determines whether the user is authorized to perform the requested device operation. When the home device stores the user profile, as in this example, the home device determines whether the user is authorized to perform the requested device operation by examining the user profile. Generally, the user profile will include the permissions associated with the user. As discussed above, the user profile can be formatted in a variety of ways and the home biometric security gateway can send various subsets of the user profile to the home device. If all user permissions are included in the user profile, the home device first locates the user permissions associated with the home device. Then the home device locates the user permissions associated with the particular device operation. The technique used to locate the correct permission can vary depending on the format of the permissions, as described above. If the user permission for the particular home device and operation do not exist, the home device can be implemented to then use a default permission or deny the user the ability to perform the particular operation. A default permission can be used in scenarios in which the user is granted permission to access a particular home device or perform a particular operation unless specifically denied. This makes configuration simpler when more users will have access to a home device than not. If the home device determines that the user is authorized to perform the requested device operation, control then flows to block 414. If the home device determines that the user is not authorized to perform the requested device operation, control then flows to block 422.

At block 414, the home device performs the device operation as requested by the user. For example, if the requested operation is to change the channel on a television, the television tunes to the channel requested by the user. This particular aspect of the process is dependent on the home device implementation. After performing the device operation as requested by the user, control then flows to block 416.

At block 416, the home device determines if the user profile is stale. As described above, the user profile stored on the home device can become out of sync with the user profile on the home biometric security gateway. In such a scenario the user profile on the home device is considered to be stale. The home device can consider a user profile that has not been updated within a certain period of time to be stale. For example, if the home device received the user profile more than one hour ago, the home device considers the user profile stale. In these scenarios, the user profile may not actually be out of sync, however the home device still marks the user profile as stale. The home device can also receive notifications from the gateway indicating that the user profile has been modified. The home device can examine a particular value to determine if the user profile is stale, such as a timestamp associated with reception of the user profile or a field indicating that the home biometric security gateway has transmitted a notification that the user profile has been modified. If the home device determines that the user profile has become stale, control then flows to block 418. If the home device determines that the user profile has not become stale, the process ends.

At block 418, the home device requests an updated user profile. Because the home device determined that the user profile was stale at block 416, the home device queries the home biometric security gateway for an updated user profile. The request for the updated user profile can include a user identifier and a value representing the version of the user profile. For example, the request can include the timestamp indicating when the user profile was received or a value included with the user profile that the home biometric security gateway increments each time the user profile is modified. This added value can allow the home biometric security gateway to determine if the user profile is actually out of sync by comparing the value with an appropriate value associated with the user profile on the home biometric security gateway. If the user profiles are not out of sync, the home biometric security gateway can indicate so instead of sending the full user profile, decreasing network traffic. The home device can then updated the value associated with the user profile if it is a timestamp or can update the user profile if a new version is returned from the home biometric security gateway. After requesting an updated user profile, the process ends.

Control flowed to block 420 if the home device determined that the user authentication failed at block 406. At block 420, the home device indicates to the user that the authentication failed. For example, a television can display a message stating that the user authentication failed or a dishwasher might disable operation and cause various lights on the dishwasher to blink. The specific manner in which the home device indicates to the user that the authentication failed will vary based on the implementation of the specific home device. After indicating to the user that the authentication failed, the process ends.

Control flowed to block 422 if the home device determined that the user was not authorized to perform the requested device operation at block 412. At block 422, the home device indicates to the user that the user is not authorized to perform the device operation. This can be accomplished similarly to indicating that the authentication failed at block 420. After indicating to the user that the user is not authorized to perform the device operation, the process ends.

As example flowcharts, the flowcharts depicted above present operations in an example order from which embodiments can deviate (e.g., operations can be performed in a different order than illustrated and/or in parallel). For example, in FIG. 4 it is depicted that the home device determines if a user profile becomes stale after performing a device operation requested by a user. However, the home device can be implemented to determine whether the user profile has become stale prior to determining whether the user is authorized to perform the device operation. The home device can also be implemented to determine whether the user profile has become stale completely independently of the process depicted in FIG. 4.

The examples discussed above make reference to various types of biometric data, particularly fingerprint and voice biometric data. However, any type of biometric data can be used. Examples of other types of biometric data include palm prints, facial data, retinal and other eye data, vein pattern data, etc. Similarly, although certain home devices are specifically referred to above, these references are made solely as examples to describe the inventive subject matter. The inventive subject matter is not limited to the specific home devices described herein.

The above examples refer to administrators. As used herein, an administrator is merely a specific type of user that is responsible for some portion of the configuration of the systems described. For example, an administrator may have permission to modify the permissions of other users, whereas the other users cannot modify permissions for any users. There can be multiple administrators in a particular system, and different administrators may have permission to modify certain aspects of the system configuration. However, some administrators may be restricted to modifying certain aspects of the system configuration. Any of the examples described above that refer to a "user" or "users" also apply to administrators.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
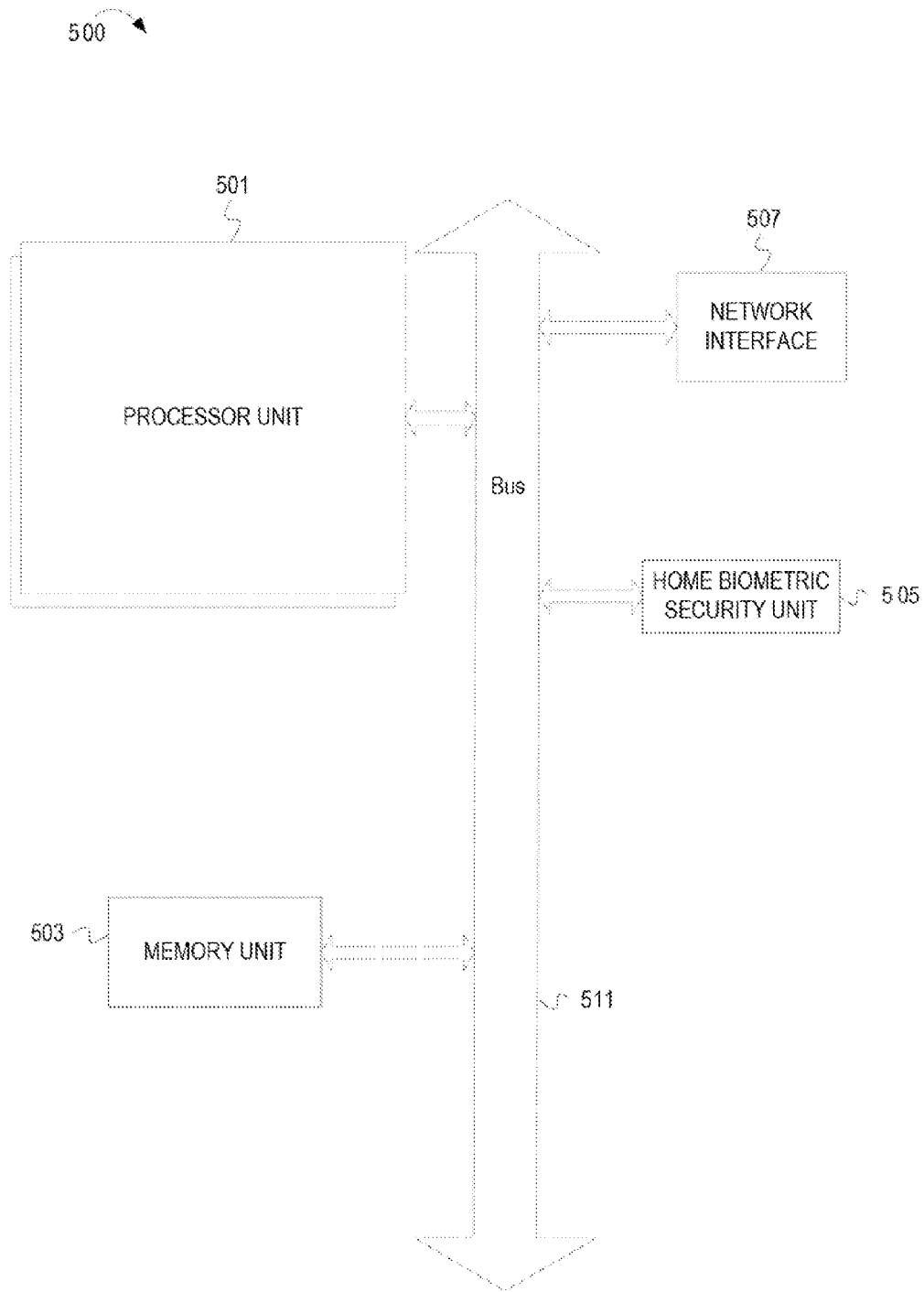
FIG. 5 depicts a block diagram of one embodiment of an electronic device including a home biometric security unit.

FIG. 5 depicts a block diagram of one embodiment of an electronic device 500 including a home biometric security unit. In some embodiments, the electronic device 500 can be a laptop computer, a tablet computer, a netbook, a mobile phone, a smart appliance, a gaming console, a router, a desktop computer, or other suitable electronic device comprising wired and/or wireless communication capabilities. The electronic device 500 includes a processor unit 501 (possibly including multiple processors, multiple cores, multiple nodes, and/or implementing multi-threading, etc.). The electronic device 500 includes memory unit 503. The memory unit 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 511 (e.g., PCI, ISA, PCI-Express, HyperTransport® bus, InfiniBand® bus, NuBus bus, etc.), a network interface 507 that include at least one of a wireless network interface (e.g., a WLAN interface, a Bluetooth® interface, a WiMAX interface, a ZigBee® interface, a Wireless USB interface, etc.) and/or a wired network interface (e.g., a powerline communication interface, an Ethernet interface, etc.), and a home biometric security unit 505. The home biometric security unit 505 embodies functionality to implement embodiments described above with reference to FIGS. 1-4. The home biometric security unit 505 functions as described above, determining whether a biometric data input matches biometric data stored in a database and communicating user authentication based on the determination. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, memory unit 503, and network interface 507, are coupled to the bus 511. Although illustrated as being coupled to the bus 511, the memory unit 503 can be coupled to the processor unit 501.

While the embodiments are described with reference to various implementations and exploitations, it will be understood that these embodiments are illustrative and that the scope of the inventive subject matter is not limited to them. In general, techniques for authentication and authorization for home devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for authentication and authorization, the method comprising:
   receiving, at a security server, a first indication of an access request for a first electronic device, wherein the first indication of the access request comprises biometric data, wherein the biometric data identifies a user requesting access to the first electronic device;
   validating the biometric data against previously captured biometric data accessible by the security server;
   in response to the biometric data being valid based, at least in part, on validating the biometric data against the previously captured biometric data,
      accessing a first user profile associated with the biometric data, wherein the first user profile comprises data that at least indicates an operation and a permission associated with the operation;
      generating a message that indicates access authorization to the first electronic device in accordance with the first user profile, wherein the message includes a subset of the first user profile that at least indicates the operation and the permission; and
      transmitting the message to the first electronic device;
   in response to the biometric data being not valid based, at least in part, on validating the biometric data against the previously captured biometric data, generating and transmitting a notification that an unauthorized access has been attempted;
   receiving, at the security server, an indication of a configuration request for the first electronic device, wherein the indication of the configuration request is associated with a zero configuration networking protocol, wherein the indication of the configuration request comprises the biometric data;
   determining whether the biometric data of the configuration request is associated with a second user profile, the second user profile having a user permission indicating that the user is permitted to configure an electronic device;
   in response to determining that the biometric data of the configuration request is associated with the second user profile, configuring the first electronic device to operate with the security server; and
   in response to determining that the biometric data of the configuration request is not associated with the second user profile, denying the configuration request.

2. The method of claim 1, wherein generating the message that indicates the access authorization in accordance with the first user profile comprises:
   determining an access permission defined in the first user profile;

determining whether the first indication of the access request indicates a type of access permitted based, at least in part, on the access permission;

generating the message with an indication of approval in response to determining that the first indication of the access request indicates the type of access permitted based, at least in part, on the access permission; and generating the message with an indication of denial in response to determining that the first indication of the access request indicates a type of access that is not permitted based, at least in part, on the access permission.

3. The method of claim 1, wherein the message includes an access permission defined in the first user profile.

4. The method of claim 1, wherein generating the message that indicates the access authorization in accordance with the first user profile comprises:

accessing operation data for the first electronic device based, at least in part, on an identifier of the first electronic device indicated in the first indication of the access request; and determining the operation from the operation data for a type of access indicated as authorized in the first user profile, wherein the first indication of the access request indicates the type of access.

5. The method of claim 1, wherein generating and transmitting the notification that the unauthorized access has been attempted comprises:

determining that a third user profile indicates a user to receive a notification when an access has been attempted with invalid biometric data;

loading the third user profile that indicates the user to receive the notification when the access has been attempted with the invalid biometric data; and transmitting the notification that the unauthorized access has been attempted with the invalid biometric data in accordance with the third user profile when the access has been attempted with the invalid biometric data.

6. The method of claim 1 further comprising:

receiving, at the security server, a second indication of the access request for the first electronic device without the biometric data in response to the biometric data being valid for the first electronic device, wherein the second indication of the access request comprises a user identifier.

7. The method of claim 1 further comprising:

receiving, at the security server, an indication of a user profile update request from the first electronic device, wherein the indication of the user profile update request comprises a user identifier.

8. The method of claim 1 further comprising:

generating and transmitting a notification that a third user profile has been modified, wherein the notification that the third user profile has been modified comprises at least one of a user identifier associated with the third user profile and the third user profile.

9. The method of claim 1, wherein the first electronic device comprises one of a microwave, a refrigerator, a washer, a dryer, a dishwasher, a toaster, a television, a game console, a video player, a cable box, a satellite receiver, an IPTV receiver, an audio receiver, and an audio player.

10. The method of claim 1, wherein the first indication of the access request further comprises at least one of an electronic device identifier and an operation identifier.

11. The method of claim 1, wherein the first indication of the access request is received from a second electronic device, wherein the first electronic device and the second electronic device are different electronic devices.

12. The method of claim 11, wherein the second electronic device comprises one of a cellphone and a control panel.

13. The method of claim 1 further comprising:

receiving, at the security server, an indication of a permission transfer request from the first electronic device, wherein the indication of the permission transfer request identifies the first user profile and a third user profile; and replicating a user permission associated with the first user profile to the third user profile.

14. The method of claim 1 further comprising:

in response to the biometric data not being valid based, at least in part, on validating the biometric data against the previously captured biometric data, creating a third user profile associated with the biometric data.

15. A non-transitory machine-readable storage medium having instructions stored therein, which when executed by a processor causes the processor to perform operations that comprise:

receiving, at a security server, a first indication of an access request for an electronic device, wherein the first indication of the access request comprises biometric data, wherein the biometric data identifies a user requesting access to the electronic device;

validating the biometric data against previously captured biometric data accessible by the security server;

in response to the biometric data being valid based, at least in part, on validating the biometric data against the previously captured biometric data, accessing a first user profile associated with the biometric data, wherein the first user profile at least indicates an operation and a permission associated with the operation; generating a message that indicates access authorization to the electronic device in accordance with the first user profile, wherein the message includes a subset of the first user profile that at least indicates the operation and the permission; and transmitting the message to the electronic device;

in response to the biometric data being not valid based, at least in part, on validating the biometric data against the previously captured biometric data, generating and transmitting a notification that an unauthorized access has been attempted;

receiving, at the security server, an indication of a configuration request for the electronic device, wherein the indication of the configuration request is associated with a zero configuration networking protocol, wherein the indication of the configuration request comprises the biometric data;

determining whether the biometric data of the configuration request is associated with a second user profile, the second user profile having a user permission indicating that the user is permitted to configure the electronic device;

in response to determining that the biometric data of the configuration request is associated with the second user profile, configuring the electronic device to operate with the security server; and in response to determining that the biometric data of the configuration request is not associated with the second user profile, denying the configuration request.

16. The non-transitory machine-readable storage medium of claim 15, wherein generating the message that indicates the access authorization in accordance with the first user profile comprises:

determining an access permission defined in the first user profile;
determining whether the first indication of the access request indicates a type of access permitted based, at least in part, on the access permission;
generating the message with an indication of approval in response to determining that the first indication of the access request indicates the type of access permitted based, at least in part, on the access permission; and
generating the message with an indication of denial in response to determining that the first indication of the access request indicates a type of access that is not permitted based, at least in part, on the access permission.

17. The non-transitory machine-readable storage medium of claim 15, wherein generating the message that indicates the access authorization in accordance with the first user profile comprises:
accessing operation data for the electronic device based, at least in part, on an identifier of the electronic device indicated in the first indication of the access request; and
determining the operation from the operation data for a type of access indicated as authorized in the first user profile, wherein the first indication of the access request indicates the type of access.

18. The non-transitory machine-readable storage medium of claim 15, wherein generating and transmitting the notification that the unauthorized access has been attempted comprises:
determining that a third user profile indicates a user to receive a notification when an access has been attempted with invalid biometric data;
loading the third user profile that indicates the user to receive the notification when the access has been attempted with the invalid biometric data; and
transmitting the notification that the unauthorized access has been attempted with the invalid biometric data in accordance with the third user profile when the access has been attempted with the invalid biometric data.

19. The non-transitory machine-readable storage medium of claim 15, wherein the operations further comprise:
receiving, at the security server, a second indication of the access request for the electronic device without the biometric data in response to the biometric data being valid for the electronic device, wherein the second indication of the access request comprises a user identifier.

20. The non-transitory machine-readable storage medium of claim 15, wherein the operations further comprise:
receiving, at the security server, an indication of a user profile update request from the electronic device, wherein the indication of the user profile update request comprises a user identifier.

21. The non-transitory machine-readable storage medium of claim 15, wherein the operations further comprise:
generating and transmitting a notification that a third user profile has been modified, wherein the notification that the third user profile has been modified comprises at least one of an user identifier associated with the third user profile and the third user profile.

22. The non-transitory machine-readable storage medium of claim 15, wherein the operations further comprise:
receiving, at the security server, an indication of a permission transfer request from the electronic device, wherein the indication of the permission transfer request identifies the first user profile and a third user profile; and
replicating a user permission associated with the first user profile to the third user profile.

23. The non-transitory machine-readable storage medium of claim 15, wherein the operations further comprise:
in response to the biometric data not being valid based, at least in part, on validating the biometric data against the previously captured biometric data, creating a third user profile associated with the biometric data.

24. A device comprising:
a network interface; and
memory including instructions stored therein, the instructions executable by a processor to cause the device to:
receive a first indication of an access request for an electronic device, wherein the first indication of the access request comprises biometric data, wherein the biometric data identifies a user requesting access to the electronic device;
validate the biometric data against previously captured biometric data accessible by the device;
in response to the biometric data being valid based, at least in part, on validation of the biometric data against the previously captured biometric data,
access a first user profile associated with the biometric data, wherein the first user profile at least indicates an operation and a permission associated with the operation;
generate a message that indicates access authorization to the electronic device in accordance with the first user profile, wherein the message includes a subset of the first user profile that at least indicates the operation and the permission; and
transmit the message to the electronic device;
in response to the biometric data not being valid based, at least in part, on validation of the biometric data against the previously captured biometric data, generate and transmit a notification that an unauthorized access has been attempted;
receive an indication of a configuration request for the electronic device, wherein the indication of the configuration request is associated with a zero configuration networking protocol, wherein the indication of the configuration request comprises the biometric data;
determine whether the biometric data of the configuration request is associated with a second user profile, the second user profile having a user permission indicating that the user is permitted to configure the electronic device;
in response to a determination that the biometric data of the configuration request is associated with the second user profile, configure the electronic device to operate with the device; and
in response to a determination that the biometric data of the configuration request is not associated with the second user profile, deny the configuration request.

25. The device of claim 24, wherein the instructions to generate the message that indicates the access authorization in accordance with the first user profile comprise instructions to:
determine an access permission defined in the first user profile;
determine whether the first indication of the access request indicates a type of access permitted based, at least in part, on the access permission;
generate the message with an indication of approval in response to a determination that the first indication of the access request indicates the type of access permitted based, at least in part, on the access permission; and
generate the message with an indication of denial in response to a determination that the first indication of the access request indicates a type of access that is not permitted based, at least in part, on the access permission.

26. The device of claim 24, wherein the instructions to generate the message that indicates the access authorization in accordance with the first user profile comprise instructions to:
    access operation data for the electronic device based, at least in part, on an identifier of the electronic device indicated in the first indication of the access request; and
    determine the operation from the operation data for a type of access indicated as authorized in the first user profile, wherein the first indication of the access request indicates the type of access.

27. The device of claim 24, wherein the instructions to generate and transmit the notification that the unauthorized access has been attempted comprise instructions to:
    determine that a third user profile indicates a user to receive notifications when an access has been attempted with invalid biometric data;
    load the third user profile that indicates the user to receive the notifications when the access has been attempted with the invalid biometric data; and
    transmit the notification that the unauthorized access has been attempted with the invalid biometric data in accordance with the third user profile when the access has been attempted with the invalid biometric data.

28. The device of claim 24, wherein the instructions further comprise instructions:
    receive a second indication of the access request for the electronic device without the biometric data in response to the biometric data being valid for the electronic device, wherein the second indication of the access request comprises a user identifier.

29. The device of claim 24, wherein the instructions further comprise instructions to:
    receive an indication of a user profile update request from the electronic device, wherein the indication of the user profile update request comprises a user identifier.

30. The device of claim 24, wherein the instructions further comprise instructions to:
    generate and transmit a notification indicating that a third user profile has been modified, wherein the notification that the third user profile has been modified comprises at least one of an user identifier associated with the third user profile and the third user profile.

31. The device of claim 24, wherein the instructions further comprise instructions to:
    receive an indication of a permission transfer request, wherein the indication of the permission transfer request identifies the first user profile and a third user profile; and
    replicate a user permission associated with the first user profile to the third user profile.

32. The device of claim 24, wherein the instructions further comprise instructions to:
    in response to the biometric data not being valid based, at least in part, on validating the biometric data against the previously captured biometric data, create a third user profile associated with the invalid biometric data.

* * * * *